United States Patent [19]

Harvey

[11] Patent Number: 4,459,005

[45] Date of Patent: Jul. 10, 1984

[54] FLASH EXPOSURE CONTROL APPARATUS FOR A FIXED-FOCUS CAMERA

[75] Inventor: Donald M. Harvey, Webster, N.Y.

[73] Assignee: Eastman Kodak Company, Rochester, N.Y.

[21] Appl. No.: 484,400

[22] Filed: Apr. 13, 1983

[51] Int. Cl.³ .................. G03B 7/085; G03B 15/05
[52] U.S. Cl. ...................... 354/403; 354/423
[58] Field of Search .............. 354/400, 402, 403, 419, 354/423, 446

[56] References Cited

U.S. PATENT DOCUMENTS

| | | | |
|---|---|---|---|
| 3,416,426 | 12/1968 | Land | 95/44 |
| 3,418,904 | 12/1968 | Wick et al. | 95/10 |
| 4,256,995 | 3/1981 | Ishida | 315/241 |
| 4,316,658 | 2/1982 | Bundschuh et al. | 354/27 |
| 4,317,624 | 3/1982 | Shenk | 354/139 |
| 4,327,978 | 5/1982 | Ishida et al. | 354/41 |
| 4,361,387 | 11/1982 | Cloutier | 354/43 |
| 4,361,389 | 11/1982 | Monks et al. | 354/139 |

*Primary Examiner*—Michael L. Gellner
*Attorney, Agent, or Firm*—Dennis P. Monteith

[57] ABSTRACT

A fixed-focus camera provides flash photography of normal-range subjects beyond a near distance which is limited by depth of field and flash overexposure. A proximity sensor, in response to detecting that a subject to be photographed is closer than the near distance, causes an override mechanism to establish an exposure aperture which is smaller than the aperture normally set for flash photography. This reduces the near distance at which both depth of field and flash exposure are acceptable.

5 Claims, 8 Drawing Figures

FLASH EXPOSURE CONTROL APPARATUS FOR A FIXED-FOCUS CAMERA

BACKGROUND OF THE INVENTION

1. Field Of The Invention

The invention relates to flash photography for a fixed-focus camera. More particularly, the invention provides apparatus, responsive to an indication of a close-up subject, for improving depth of field and flash exposure control for close-up flash photography.

2. Description Of The Prior Art

A camera provides an acceptably focused image of subjects within its depth of field. For a fixed-focus camera having lens apparatus focused at its hyperfocal distance, all subjects beyond a near distance, which is one-half the hyperfocal distance, appear in focus. To further reduce the near distance, and thereby increase depth of field, fixed-focus cameras use a lens of relatively small maximum aperture. However, a small aperture limits an ambient exposure with a hand-held camera to relatively high ambient light conditions, and limits a flash exposure to relatively short-range subjects.

A notable exception to a fixed-focus camera having these limitations is the disc 4000 camera manufactured by the Eastman Kodak Company of Rochester, N.Y. and disclosed in U.S. Pat. No. 4,361,387, which is commonly assigned herewith. This camera (and other disc cameras manufactured by Eastman Kodak) has optics of relatively short focal length, e.g. 12.5 millimeters, and therefore has a relatively large maximum exposure aperture, e.g. f/2.8. Additionally, this disc camera takes advantage of the wide exposure latitude of color print film to allow fully automatic exposure control with a simple exposure control system by providing only two exposure settings, e.g. 1/200 of a second at f/6 when ambient light is above 125 foot-lamberts, and 1/100 of a second at f/2.8 with flash illumination when ambient is below 125 foot-lamberts.

At f/2.8, the minimum acceptable distance for a subject in focus is approximately 1.2 meters, whereas at f/6 a subject as close as 0.6 meter is acceptably focused. In low light conditions when the f/2.8 aperture and flash illumination are used, a subject closer to the camera than the minimum depth of field would be not only out of focus but may also be overexposed, because of the relation between flash illumination and subject distance. Because the exposure setting and the flash decision are made automatically, a photographer may not know which exposure mode will be selected. For a close-up subject in marginal ambient light, the photographer may take an unacceptable flash picture or may decide not to take a picture, when in fact an acceptable ambient exposure would occur.

SUMMARY OF THE INVENTION

In view of the foregoing, an object of the invention is to overcome the aforementioned problem of prior art fixed-focus cameras and thereby provide exposures of close-up subjects that are acceptable from the standpoint of both focus and exposure control. This object is achieved by providing in a fixed-focus camera having a flash exposure mode a proximity sensing means, e.g. a close-up ranging device, to determine whether or not a subject to be photographed is within a near range at which a flash exposure would normally be unacceptably focused. When the subject is in that range, a flash exposure aperture is established, the size of which is smaller than the aperture normally established for a flash exposure, to reduce the near distance at which both focus and flash exposure are acceptable.

In one preferred embodiment, the fixed-focus camera includes a proximity sensor having an output for signaling whether a photographic subject is within a predetermined relatively close proximity to the camera. A mechanism is provided for a camera operator for establishing a restricted exposure aperture when the proximity sensor signals that the photographic subject is within the aforementioned close proximity. The restricted aperture is less than the aperture normally established for a flash exposure, thereby reducing the near distance at which both depth of field and flash exposure are acceptable, to provide acceptable flash photography of a close-up subject.

In a second preferred embodiment, the mechanism for restricting the exposure aperture is actuated automatically in response to the proximity sensor detecting a close proximity subject.

The proximity sensor need only detect that the photographic subject is closer than a given near distance. Thus, the proximity sensor requires little energy to operate, and can be relatively inexpensive. The invention and its other advantages will become more apparent in the detailed description of the preferred embodiments presented below.

DESCRIPTION OF THE DRAWINGS

In the detailed description of preferred embodiments of the invention presented below, reference is made to the accompanying drawings, in which.

DETAILED DESCRIPTION OF A PREFERRED EMBODIMENT

Because photographic cameras and electronic flash apparatus are well known, the present description will be directed in particular to elements forming part of, or cooperating directly with, apparatus in accordance with the present invention. It is to be understood that camera and flash apparatus elements not specifically shown or described may take various forms well known to those having skill in the art.

Figure 1:
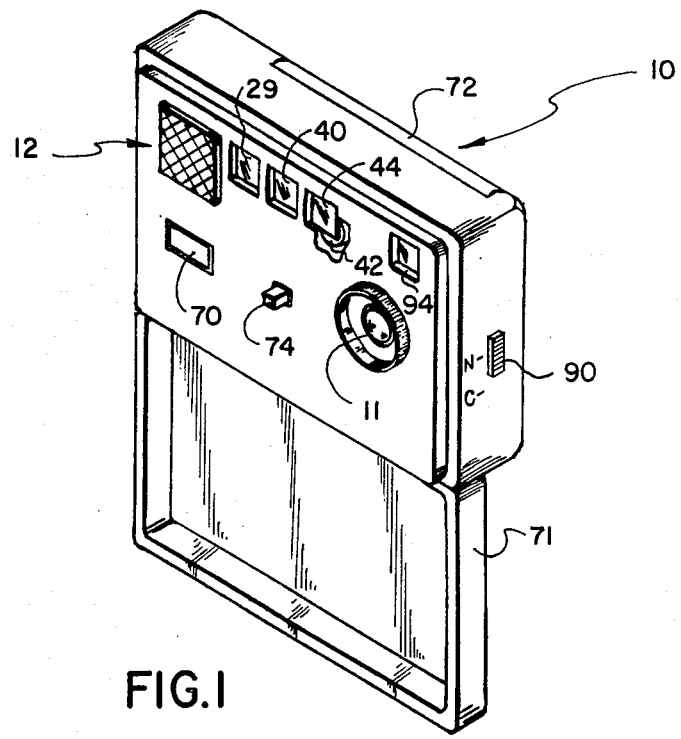
FIG. 1 is a perspective view of a fixed-focus camera having an electronic strobe flash unit.
Figure 5:
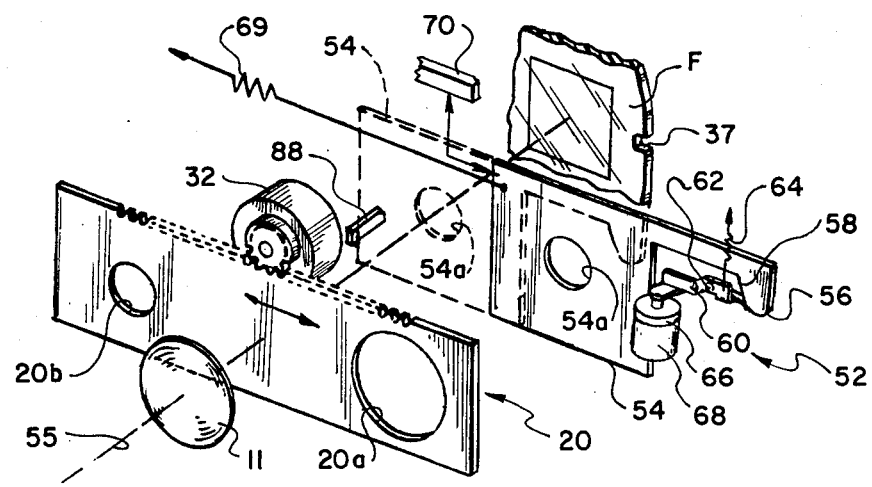
FIG. 5 is an exploded perspective view of a preferred embodiment of apparatus according to the invention for automatically extending the range in the near direction at which both depth of field and flash exposures are acceptable.
Figure 2:
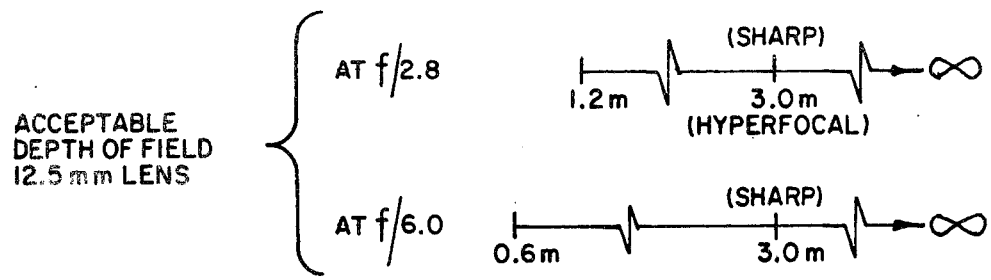
FIG. 2 illustrates acceptable depth of field for a fixed-focus camera of the prior art.

Referring to FIG. 1, a camera 10 has a lens 11, which is mounted along a picture-taking axis in fixed relation to the camera's exposure plane. The lens 11 is illustrated in FIG. 5 as a simple single element lens, but can actually include several converging and diverging elements. In a preferred embodiment, the lens 11 has a 12.5-millimeter focal length and an f/2.8 aperture, and is focused at its hyperfocal distance, about 3 meters. A lens of this type is used in disc cameras manufactured by Eastman Kodak Company of Rochester, N.Y. It has been demonstrated that its depth of field is acceptable for subjects at infinity, in the far direction, to about 1.2 meters, in the near direction, as shown in FIG. 2.

The aforementioned Kodak disc cameras control exposure with either of two predetermined apertures, f/2.8 or f/6. When the lens 11 is provided with a stopped down aperture, depth of field is extended in the near direction; as shown in FIG. 2, when the lens 11 is stopped down to f/6, depth of field is extended in the near direction to about 0.6 meter.

The camera 10 is also provided with a source of flash illumination, such as an electronic strobe flash unit 12, for flash photography. Flash unit 12 may be formed either as an integral part of the camera 10, as shown, or, alternatively, may be attachable to the camera.

In dark light conditions, the flash unit 12 and the camera 10 are arranged to produce a so-called "optimum" photographic exposure of a subject which may be, for example, approximately 2.7 meters from the camera 10. This assumes a film having an ISO speed of 200/24° (such as disc film manufactured by Eastman Kodak), medium subject reflectivity of about 25 percent, an f/2.8 exposure aperture, and a fully charged flash unit.

Figure 3A:
FIGS. 3A and 3B illustrate, for the camera and flash unit of FIG. 1, range of distances at which acceptable flash exposures occur for subjects of medium reflectivity.

With many negative films, such as Kodak disc film, acceptable exposures occur even when the film is overexposed from what is considered the "optimum" exposure, up to the equivalent of 3 stops, or when the film is underexposed from the "optimum", down the equivalent of 2 stops. FIG. 3A shows the range of distances of subjects having medium reflectivity for which the flash unit 12 produces acceptable flash exposures of ISO 200/24° negative film at f/2.8 when film overexposure of 3 stops, shown as (+3), and underexposure of 2 stops, shown as (−2), are taken into account.

Figure 4:
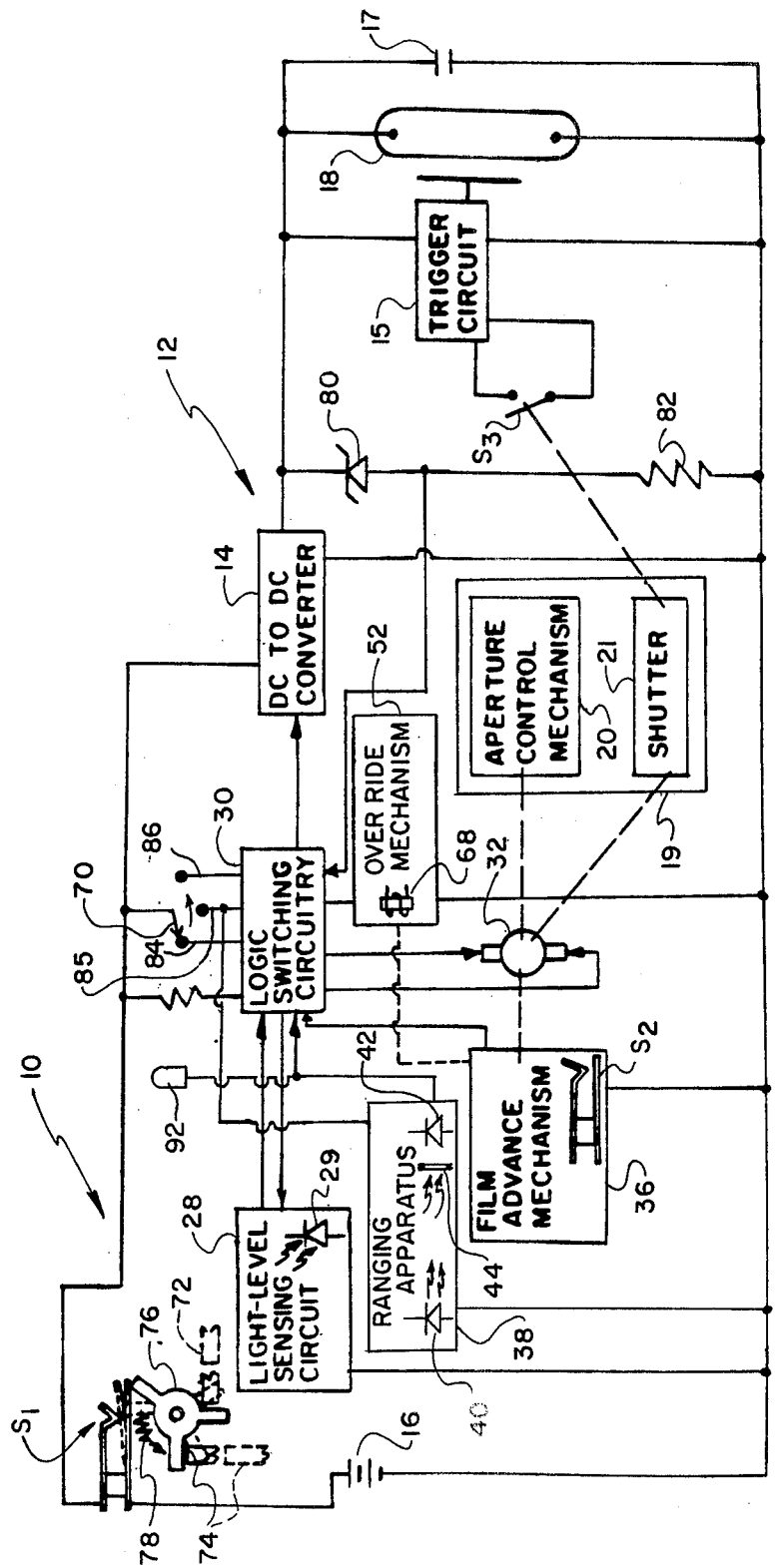
FIG. 4 is a block diagram of the camera and flash unit of FIG. 1.

Referring to FIG. 4, the flash unit 12 includes a DC to DC converter 14 and a conventional flash trigger circuit 15. The converter 14, which is powered by a low-voltage battery 16, for example a six-volt battery, operates to charge a flash-firing capacitor 17 for flashing a flash tube 18.

The camera 10 includes an exposure control mechanism 19, which has an aperture control mechanism 20 for adjusting an exposure aperture, and a shutter 21 for regulating an exposure interval. As described below, the exposure control mechanism 19 causes the aperture control mechanism 20 to select a relatively large exposure aperture and causes the shutter 21 to operate at a relatively slow shutter speed when ambient light intensity is below a predetermined, relatively low level, for example below about 125 foot-lamberts. The mechanism 19 causes the aperture control mechanism 20 to select a relatively small exposure aperture and causes the shutter 21 to operate at a relatively fast shutter speed when ambient light intensity is relatively bright, for example above 125 foot-lamberts. In the preferred embodiments, the exposure aperture is f/2.8 and the shutter speed is 1/100 second in relatively low ambient light, and the exposure aperture is f/6 and the shutter speed 1/200 second in relatively bright ambient light.

The exposure control mechanism 19 also causes the flash unit 12 to fire for a full-flash exposure whenever ambient light intensity is below 125 foot-lamberts, and exposures are made solely with ambient light when ambient light intensity is above 125 foot-lamberts. However, it will be understood by those skilled in the art that other than two aperture size and shutter speed combinations may be used for controlling exposure, and that flash illumination may also be used under relatively bright ambient light conditions for a fill-in flash exposure.

To cause the exposure control mechanism 19 to control exposure as a function of ambient light, a light-level sensing circuit 28 operates to measure ambient light intensity. The light-level sensing circuit 28, which includes a photodiode 29 mounted on the face of the camera 10 to sense ambient light, is arranged to produce a logic level 1 output voltage (relatively high voltage) when subject light intensity is above the aforementioned 125 foot-lamberts, and a logic level 0 output voltage (relatively low voltage) when subject light intensity is below 125 foot-lamberts.

Logic switching circuitry 30 is arranged to cause energizing of a bi-directional motor 32 in accordance with the aforementioned logic level voltages from the light-level sensing circuit 28. The circuitry 30 causes the motor 32 to be driven in a positive or clockwise direction when the light-level sensing circuit 28 produces a logic level 0 voltage, and causes it to be driven in a counterclockwise direction when the circuit 28 produces a logic level 1 voltage.

The motor 32 is arranged to sequentially actuate the exposure control mechanism 19, for an exposure, and a film advance mechanism 36, for advancing film after exposure. When the motor 32 is driven in the clockwise direction for an exposure, it causes the aperture control mechanism 20 to set the exposure aperture at f/2.8 and the shutter to operate at 1/100 second. When the shutter 21 is operated at that speed, it closes a normally open flash synchronization switch $S_3$, which causes the flash unit 12 to fire during exposure.

When the motor 32 is driven in the counterclockwise direction for an exposure, it causes the aperture control mechanism 20 to set the exposure aperture at f/6, and the shutter 21 to operate at 1/200 second. When the shutter 21 is operated at this speed, the flash synchronization switch $S_3$ remains open.

The film advance mechanism 36 includes a film-metering pawl (not shown) for positioning film F, FIG. 5, for an exposure. A normally open film-metering switch $S_2$ is held closed by the pawl when it is positioned between adjacent notches 37 located seriatim along an edge portion of the film strip, and the switch $S_2$ is open when the pawl is located within a film notch, i.e. the pawl is registering film for an exposure. The condition of the switch $S_2$ provides a further electrical input to the logic switching circuitry 30 for controlling the motor 32.

The logic switching circuitry 30 is constituted primarily by a variety of conventional low-power digital logic gates, which may be readily manufactured in integrated circuit form. The aperture control mechanism 20, the shutter 21, the film advance mechanism 36, and the motor 32 form a highly automated system for effecting a photographic cycle. Logic switching circuitry of the foregoing type is more fully described in U.S. Pat. No. 4,361,389, which is commonly assigned herewith, and a highly automated photographic system is more fully described in the aforementioned U.S. Pat. No. 4,361,387, the disclosures of which are incorporated herein by reference.

Unlike the cameras described in the above U.S. Pat. Nos. 4,361,387 and 4,361,389, the camera 10, according to the present invention, includes proximity sensing means for detecting when a subject to be photographed is within a given distance of the camera, and a mechanism for restricting the exposure aperture to a size that is less than the aperture size the exposure control mechanism 19 would normally select when the photographic subject is within the aforementioned given distance. In the preferred embodiments disclosed herein, the size of the exposure aperture is restricted to f/6 whenever a close-up subject is detected. The selection of a small aperture size for a short-range subject not only extends the range of subject distances in the near direction at which depth of field is acceptable, as disclosed above, but also extends the range of subject distances in the near direction at which a flash exposure is acceptable. Although the restricted aperture reduces the maximum distance possible for an acceptable flash exposure, the reduced maximum flash distance still extends beyond the close-up subject.

Proximity sensing means, such as ranging apparatus 38, operates to detect when the distance between a subject to be photographed and the camera 10 is less than the minimum distance at which depth of field is acceptable with an f/2.8 aperture, e.g. 1.2 meters. As described in more detail hereinafter, the ranging apparatus 38 is arranged to produce a logic level 1 output voltage whenever a photographic subject is within 1.2 meters of the camera 10, and it produces a logic level 0 voltage for subjects beyond 1.2 meters.

The ranging apparatus 38 may be any of a variety of forms well known in the art as a 2-zone or 2-position rangefinder. In a preferred embodiment, the ranging apparatus 38 includes an infrared LED 40, mounted on the front face of the camera 10, for transmitting infrared light toward a subject to be photographed, an infrared-sensitive photodiode 42, also on the face of the camera 10, for sensing infrared light reflected from the subject, and an infrared transmitting filter 44 positioned between the photodiode 42 and the subject. The ranging apparatus 38 includes a regulated source of electrical energy (not shown) for energizing the LED 40 so that a fixed amount of infrared light is produced each time the LED is fired. The photodiode 42 produces a current signal related to the intensity of infrared light impinging upon it. Circuitry (also not shown) coupled to the photodiode 42 detects the peak amplitude of the AC portion of this signal, which is inversely related to the square of subject distance, and produces the aforementioned logic level output voltages according to subject distance. Because the ranging apparatus 38 serves to automatically detect close-up subjects, it requires little electrical energy to operate, and can be relatively inexpensive.

An override mechanism 52 is arranged to restrict the camera exposure aperture to f/6 whenever the ranging apparatus 38 detects a photographic subject within the aforementioned 1.2 meters of the camera 10.

Referring now to the embodiment of FIG. 5, the override mechanism 52 includes a blade 54 having an f/6 aperture 54a. The blade 54 is slidably mounted upon suitable support means (not shown) for movement transverse to the picture-taking axis 55 of the lens 11 between a remote position, shown by the solid lines, and an axis-intersecting position, shown by the dashed lines.

The blade 54 includes a detent 56 having a cam surface 58 adapted to engage a retaining lever 60, which is pivotally mounted on a pin 62 and is biased by a weak spring 64 in a counterclockwise direction into engagement with the detent 56. The opposite end of the lever 60 is connected to an electromagnetic keeper 66, which is positioned adjacent a pole of an electromagnet 68.

The electromagnet 68 is caused to be energized and de-energized by the logic switching circuitry 30 in accordance with the aforementioned logic level output voltages produced by the ranging apparatus 38. Specifically, the electromagnet 68 is energized when the circuitry 30 receives a logic level 0 voltage from the apparatus 38, i.e. the photographic subject is farther than 1.2 meters from the camera 10, and the electromagnet is de-energized when the circuitry 30 receives a logic level 1 voltage from the apparatus 38, i.e. the subject is within 1.2 meters.

When the electromagnet 68 is energized, it magnetically latches the lever 60, which thereby blocks the blade 54 in its remote position. When the electromagnet 68 is de-energized, a strong spring 69 pulls the blade 54 into its axis-intersecting position. A shutter-release member 70 is arranged, by means shown only diagrammatically, to hold the blade 54 in its remote position prior to the actuating of the camera 10 to initiate an exposure.

Figure 7:
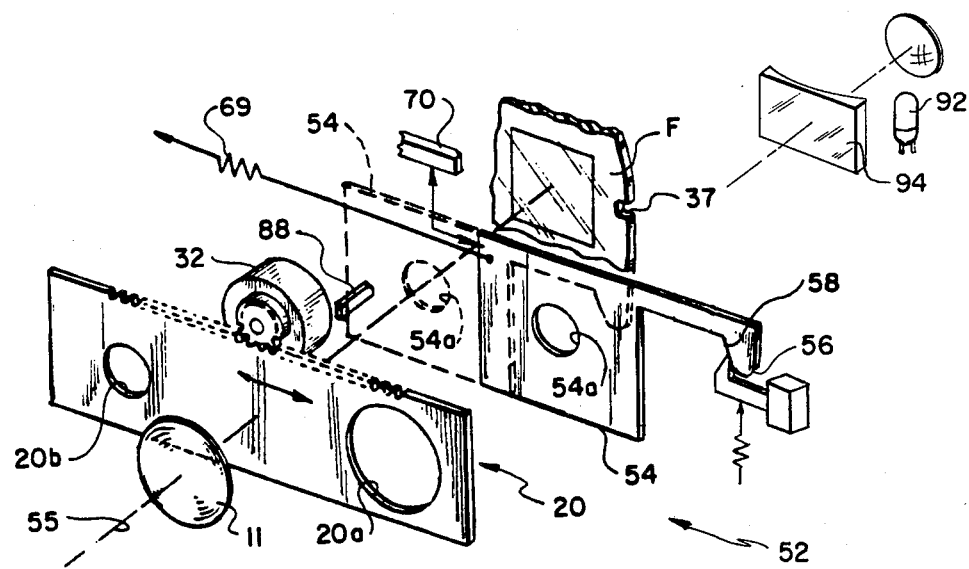
FIG. 7 is an exploded perspective view of an alternative preferred embodiment of apparatus according to the invention.

In an alternative preferred embodiment of FIG. 7, a spring-biased latch member 90 is accessible to a camera operator for slidable movement on the side of the camera 10 between a normal position, N, and a close-up position, C, shown in FIG. 1. When the member 90 is in its normal position, it latches the blade 54 in its remote position, and when the member 90 is moved to its close-up position, the spring 69 pulls the blade 54 into its axis-intersecting position.

In the embodiments of FIGS. 5 and 7, the film advance mechanism 36, by means shown only diagrammatically (FIG. 4), is arranged to return the blade 54 from its axis-intersecting position to its remote position as film F is advanced for the next exposure.

The flash unit 12 charges automatically in response to the readying of the camera 10 to implement a photographic cycle. The camera 10 is readied to implement a photographic cycle when a pivotally mounted cover 71 (FIG. 1) is moved to uncover the camera 10, and a film-loading door 72 (also FIG. 1) is closed.

A post 74 is resiliently biased outwardly in the forwardly facing wall of the camera 10. When the cover 71 is in a camera-covering position, it depresses the post 74, shown by the solid lines of FIG. 4, and when the cover 71 is moved to a camera-uncovering position, the post 74 is released, shown by the dashed lines of FIG. 4. The closing of the door 72, or the moving of the cover 71 to uncover the camera 10, (both illustrated in FIG. 4 by dashed lines), whichever occurs last, causes a pivoted lever 76 to move in the counterclockwise direction under the influence of a spring 78. This movement allows a normally closed switch $S_1$ to close. When the switch $S_1$ is closed, battery voltage is applied to the converter 14, which causes charging of the flash unit 12.

When the flash unit 12 becomes fully charged, a zener diode 80 conducts. This conduction produces a sudden voltage at the junction between the diode 80 and a resistor 82. In response to that voltage, the logic switching circuitry 30 causes the converter 14 to turn off.

The shutter-release member 70 is resiliently biased outwardly on the front face of the camera 10 for movement from a deactuated position 84 through an intermediate position 85, at which energizing of the ranging apparatus 38 occurs, to a fully actuated position 86, at which energizing of the motor 32 occurs. An exposure cycle is initiated when the shutter-release member 70 reaches its intermediate position 85. However, an actual exposure is delayed until the member 70 reaches its fully actuated position 86. This delay is sufficient to allow the ranging apparatus 38 and the override mechanism 52 to operate prior to the initiating of an exposure.

The camera 10 is aimed at a subject to be photographed and the shutter-release member 70 is depressed. The logic switching circuitry 30 causes the converter 14 to charge the flash unit 12 in response to movement of the member 70 from its deactuated position 84. This charging replenishes any charge which may have leaked from the flash unit 12 during the intervening time the converter 14 was off after the camera 10 was readied to implement a photographic cycle.

Until the member 70 assumes its intermediate position 85, the converter 14 charges the flash unit 12, so long as it is less than fully charged. Once the predetermined high voltage on the capacitor 17 is reestablished, the circuitry 30, in response to the sudden voltage at the junction between the diode 80 and the resistor 82, causes the converter 14 to turn off.

Under most picture-taking circumstances, it can be expected that a camera operator would actuate the member 70 only a relatively short time after having readied the camera 10 to implement a photographic cycle. Any charge which may have leaked from the flash unit 12 during the intervening time the converter 14 was off would be at the most very slight, and, thus, any additional charging of the flash unit 12 necessary to return it to a fully charged condition would be very brief. Apparatus of the type disclosed above for charging the flash unit 12 is more fully disclosed in the aforementioned U.S. Pat. No. 4,361,389.

Whether or not the flash unit 12 becomes fully charged, in response to the shutter-release member 70 assuming its intermediate position 85, the circuitry 30 causes the converter 14 to turn off. Also, when the member 70 reaches its position 85, the battery 16 is connected to the ranging apparatus 38, thereby turning it on. This causes the energizing of the LED 40, which produces a pulse of infrared light which is projected towards the subject to be photographed. The infrared photodiode 42 then senses the infrared light reflected from the subject and the ranging apparatus 38 produces the aforementioned logic level voltage corresponding to subject distance.

Referring now to the operation of the override mechanism 52 of FIG. 5, the circuitry 30 causes the energizing of the electromagnet 68 as soon as the shutter-release member 70 assumes its intermediate position 85. Thus, the blade 54 is initially latched in its remote position as the ranging apparatus 38 measures camera-to-subject distance.

The circuitry 30 causes de-energization of the electromagnet 68, if the output of the ranging apparatus 38 corresponds to a subject within 1.2 meters of the camera 10, and the circuitry 30 maintains the energization of the electromagnet 68 if the output of the ranging apparatus corresponds to a subject that is greater than 1.2 meters from the camera.

If the electromagnet 68 is de-energized, the strong spring 69 causes the detent 56 to overpower the bias of the weaker spring 64 and to cam the lever 60 in a clockwise direction. The blade 54 is released to move under the influence of the spring 69 to its axis-intersecting position, shown by the dashed lines, adjacent a stop 88, wherein the f/6 aperture 54a is aligned with the picture-taking axis 55. Thus, the override mechanism 52 of FIG. 5 automatically sets the camera's exposure aperture at f/6, whenever the subject to be photographed is detected as being closer than 1.2 meters to the camera 10.

If the electromagnet 68 is maintained in an energized state, the blade 54 is magnetically held in the position shown by the solid lines of FIG. 5. Thus, the override mechanism 52 has no influence on the setting of the camera exposure aperture when the photographic subject is beyond the aforementioned 1.2 meters.

Referring now to the override mechanism 52 of FIG. 7, the ranging apparatus 38 causes energization of a warning lamp 92 whenever the ranging apparatus detects a subject within 1.2 meters of the camera 10. The lamp 92, which preferably is situated within a camera viewfinder 94, provides a signal to the camera operator that the photographic subject is close to the camera 10. When the lamp 92 is energized, the operator then sets the camera 10 for a close-up exposure by sliding the member 90 from its normal position N to its close-up position C. This releases the blade 54 for movement under the influence of the spring 69 to its axis-intersecting position, thereby stopping the exposure aperture down to f/6.

While the ranging apparatus 38 and the override mechanism 52 are operating as disclosed immediately above, the light-level sensing circuit 28 is measuring ambient light intensity and providing the aforementioned logic level voltage corresponding to ambient light intensity to the circuitry 30.

The circuitry 30 causes energization of the motor 32 when the shutter-release member 70 is fully depressed to its position 86. When ambient light is below 125 foot-lamberts, the circuitry 30 causes the motor 32 to be driven in the clockwise direction, thereby moving the aperture control mechanism 20 from right to left, as viewed in FIGS. 5 and 7, to align the f/2.8 exposure aperture 20a with the axis 55. Then, the motor 32 causes the shutter 21 to operate at 1/100 second, thereby causing the flash synchronization switch S₃ to close which fires the flash unit 12.

When ambient light is above 125 foot-lamberts, the circuitry 30 causes the motor 32 to be driven in the clockwise direction, thereby moving the aperture control mechanism 20 from left to right to align the f/6 aperture 20b with the axis 55. Then, the motor 32 causes the shutter 21 to operate at 1/200 second, for an ambient exposure.

From the foregoing, it is readily apparent that when the ranging apparatus 38 has detected a close-up or short-range subject, exposure occurs with the f/6 aperture, independently of the ambient light intensity detected by the circuit 28. In the embodiment of FIG. 5, the override mechanism 52 causes the f/6 aperture to be set automatically, and in the embodiment of FIG. 7, the camera operator causes the override mechanism 52 to set the f/6 aperture. In each embodiment, a flash exposure occurs in relatively low ambient light, and an ambient exposure occurs in relatively bright ambient light.

On the other hand, a subject farther than 1.2 meters from the camera 10 is photographed with flash light at an f/2.8 aperture, or solely with ambient light at an f/6 aperture, depending upon the ambient light intensity sensed by the circuit 28.

Figure 3B:
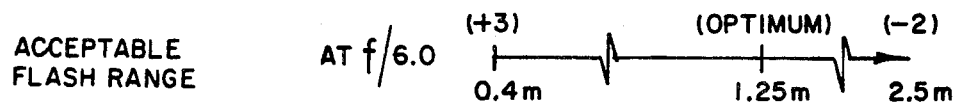
Figure 6:
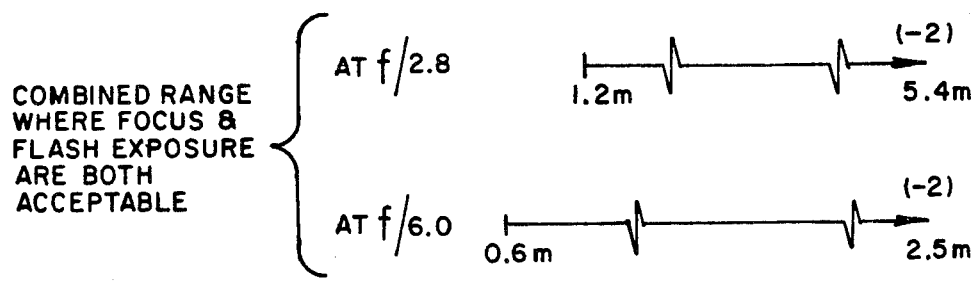
FIG. 6 illustrates, for the camera and flash unit of FIG. 1, range of subject distances, at which both depth of field and flash exposure are acceptable.

When an exposure occurs with an f/6 aperture, acceptable depth of field is extended in the near direction to approximately 0.6 meter, as is shown in FIG. 2. When an f/6 exposure occurs with flash, the near distance at which an acceptable flash exposure occurs is extended to approximately 0.4 meter, as is shown in FIG. 3B. The distance in the near direction at which both depth of field and flash exposure are acceptable is 0.6 meter, as is shown in FIG. 6. This compares favorably to the distance in the near direction at which both depth of field and flash exposure are acceptable using the normal f/2.8 aperture of the mechanism 20, i.e. 1.2 meters. Thus, the present invention provides both a more sharply defined image and a more proper flash exposure of a close-up subject.

The above description of the operation of the invention assumes that the ranging apparatus is not sensitive to variations in subject reflectivity. Although some forms of ranging apparatus are relatively insensitive to subject reflectivity, e.g. triangulation rangefinders, this is not necessarily the case with ranging apparatus that measures the amount of reflected light.

In the practicing of the invention, a problem can arise with reflectivity-sensitive ranging apparatus when a low-reflectivity subject is situated closer than 1.2 meters of the camera 10, as that subject might appear to such ranging apparatus as being farther from the camera. Thus, in low ambient light, the aperture may be set at f/2.8 by the mechanism 20 instead of f/6 by the override mechanism 52. For an extremely low-reflectivity subject this larger aperture might be desirable in order to have an acceptable flash exposure. However, a subject closer than 1.2 meters and photographed with an f/2.8 aperture would not be properly focused, as is shown in FIG. 2.

To overcome this problem, the ranging apparatus 38 is calibrated so that a subject having a reflectivity well below average and located 1.2 meters from the camera 10 causes the ranging apparatus 38 to produce a logic level 1 output voltage, and the same subject located slightly beyond 1.2 meters causes the ranging apparatus to produce a logic level 0 output voltage. In a preferred embodiment, I prefer to calibrate the apparatus 38 for a subject at 1.2 meters having a reflectivity of only 12.5 percent, although reflectivity for an average subject is about 25 percent. Thus, the ranging apparatus produces a logic level 1 output voltage and the override mechanism 52 sets the f/6 aperture for any subject which is at or slightly closer than 1.2 meters to the camera 10 and which has a reflectivity anywhere from a relatively high percent down to 12.5 percent.

A further feature of the invention is that its beneficial effects are insensitive to subjects of relatively high reflectivity. For example, a subject having a relatively high reflectivity, and which is greater than 1.2 meters from the camera 10, might appear to the ranging apparatus 38 as being closer than 1.2 meters. If this were the case in low ambient light, the exposure aperture would be set at f/6 by the override mechanism 52 instead of the normal f/2.8 aperture by the mechanism 20. This restricted aperture would normally not prevent an acceptable flash exposure as a high reflectivity subject would reflect additional flash illumination and thereby extend the range in the far direction to which an acceptable flash can occur. Of course, depth of field provided by the f/6 aperture would be acceptable.

The invention has been disclosed in detail with reference to two preferred embodiments thereof, but it will be understood that variations and modifications can be effected within the spirit and scope of the invention. For example, in the preferred embodiments disclosed above, the mechanism 52 operates to override the aperture control mechanism 20 only in relatively low ambient light. Because of this, the ranging apparatus 38 may be arranged to operate only in low ambient light. Also, the override mechanism 52 may be arranged to have a normal position in which the f/6 aperture 54a is aligned with the picture-taking axis 55, and is moved to its remote position whenever the ranging apparatus 38 detects that the photographic subject is beyond the distance at which acceptable flash exposure occurs when the f/6 aperture is used, i.e. 2.5 meters.

In the presently preferred embodiments disclosed herein, the override mechanism 52 operates to restrict the exposure aperture to f/6 whenever the ranging apparatus detects a photographic subject within a predetermined distance of the camera. Because the aperture control mechanism 20 selects the same aperture size whenever ambient light intensity is above 125 foot-lamberts, the override mechanism 52, compared to the mechanism 20, actually operates to improve depth of field and flash exposure control only for a close-up subject photographed in low ambient light. However, it will be readily apparent to those skilled in the art that the override mechanism 52 may be operated to stop the exposure aperture down beyond the smallest aperture size normally selected by the aperture control mechanism 20, thereby enhancing depth of field and improving a flash exposure for any close-up subject, independently of ambient light intensity.

What is claimed is:

1. In a camera having an adjustable exposure control mechanism including aperture defining means arranged to establish a flash exposure aperture, means for operatively receiving a source of flash illumination adapted for providing an acceptable flash exposure of normal-range subjects throughout a range of distances extending outwardly from a first near distance when said aperture defining means establishes said flash exposure aperture, and lens apparatus having a fixed focal length providing an acceptable depth of field of normal-range subjects throughout a range of distances extending outwardly from a second near distance when said aperture defining means establishes said flash exposure aperture, the improvement comprising:
   (a) proximity sensing means having an output for signaling whether a subject to be photographed is within a predetermined relatively close proximity to said camera; and
   (b) means for establishing a restricted exposure aperture when said proximity sensing means signals that the photographic subject is within the aforementioned close proximity, the size of the restricted aperture being smaller than the aperture normally established by said aperture defining means for a flash exposure to reduce the near distance at which both depth of field and flash exposure are acceptable for normal-range photography, to provide acceptable flash photography of a close-up subject.

2. In a camera having an adjustable exposure control mechanism including aperture defining means arranged to establish a flash exposure aperture, means for operatively receiving a source of flash illumination adapted for providing an acceptable flash exposure of normal-range subjects throughout a range of distances extending outwardly from a first near distance when said aperture defining means establishes said flash exposure aperture, and lens apparatus having a fixed focal length providing an acceptable depth of field of normal-range subjects throughout a range of distances extending outwardly from a second near distance when said aperture defining means establishes said relatively large exposure aperture, the improvement comprising:

(a) proximity sensing means actuatable for detecting whether a subject to be photographed is within a predetermined relatively close proximity to said camera; and (b) means, responsive to said proximity sensing means detecting that the photographic subject is within the aforementioned close proximity to said camera, for establishing an exposure aperture the size of which is less than the flash exposure aperture normally established by said aperture defining means to reduce the near distance at which both depth of field and flash exposure are acceptable for normal-range photography, to provide acceptable flash photography of a close-up subject.

3. A camera as claimed in claim 2 wherein said proximity sensing means operates to detect that the photographic subject is within a predetermined relatively close distance which is less than the particular near distance at which depth of field is acceptable when said flash exposure aperture is used.

4. In a camera having an adjustable exposure control mechanism including aperture defining means arranged to establish a flash exposure aperture and a shutter for regulating an exposure interval, a release member mounted for pre-exposure movement from a first to a second position at which operation of said shutter is effected, means for operatively receiving a source of flash illumination adapted for providing an acceptable flash exposure of normal-range subjects throughout a range of distances extending outwardly from a given near distance when said aperture defining means establishes said relatively large exposure aperture, lens apparatus having a fixed focal length providing an acceptable depth of field of normal-range subjects over a range of distances extending outwardly from a particular near distance when said aperture defining means establishes said flash exposure aperture, and means for firing the flash source to provide flash illumination in synchronism with operation of said shutter, the improvement comprising:

(a) proximity sensing means, responsive to pre-exposure movement of said release member to its second position, for detecting whether a subject to be photographed is within a predetermined relatively close proximity to said camera; and (b) means, responsive to said proximity sensing means detecting that the photographic subject is within the aforementioned close proximity to said camera, for establishing an exposure aperture the size of which is less than the flash exposure aperture normally established by said aperture defining means to reduce the near distance at which both depth of field and flash exposure are acceptable for normal-range photography, to provide acceptable close-up flash photography.

5. In a camera having light-level sensing circuitry arranged to sense ambient light and having (1) a first condition when ambient light intensity is below a predetermined level, and (2) a second condition when ambient light intensity is above the predetermined level, an adjustable exposure control mechanism including aperture defining means arranged to establish a relatively large exposure aperture and a relatively small exposure aperture and a shutter for regulating an exposure interval, means for operatively receiving a source of flash illumination adapted for providing an acceptable flash exposure of normal-range subjects throughout a range of distances extending outwardly from a given near distance when said aperture defining means establishes said relatively large exposure aperture, lens apparatus having a fixed focal length providing an acceptable depth of field of normal-range subjects throughout a range of distances extending outwardly from a particular near distance when said aperture defining means establishes said relatively large exposure aperture, and control means, coupling said light-level sensing circuitry and said exposure control mechanism, for causing said aperture defining means to establish its relatively large exposure aperture and for causing firing of the flash illumination source in synchronism with operation of said shutter when said sensing circuitry is in its first condition, and for causing said aperture defining means to establish its relatively small exposure aperture and for precluding firing of the flash source when said sensing circuitry is in its second condition, the improvement comprising:

(a) proximity sensing means actuatable for detecting whether a subject to be photographed is within a predetermined relatively close proximity to said camera; and (b) override means, responsive to said proximity sensing means detecting that the photographic subject is within the aforementioned close proximity to said camera, for establishing an exposure aperture the size of which is less than the relatively large exposure aperture established by said aperture defining means when ambient light intensity is relatively low, to reduce the near distance at which both depth of field and flash exposure are acceptable for normal-range photography, to provide acceptable close-up flash photography.

* * * * *